United States Patent Office 3,446,874
Patented May 27, 1969

3,446,874
POLYMERIZABLE SOLVENT ADHESIVE COMPOSITION CONTAINING MIXED COBALT/ZINC CATALYST PROMOTER
Alan E. Varker, Philadelphia, Pa., assignor, by mesne assignments, to ESB Incorporated, Philadelphia, Pa., a corporation of Delaware
No Drawing. Filed Mar. 4, 1966, Ser. No. 531,733
Int. Cl. C08f 1/74, 15/40
U.S. Cl. 260—880
6 Claims

ABSTRACT OF THE DISCLOSURE

Compositions useful as adhesives for polystyrene- and ABS-type resins which consist of (1) a solute polymer selected from the group consisting of polystyrene, acrylonitrile-butadiene rubbers, acrylonitrile-butadiene-styrene resins, styrene-acrylonitrile resins, styrene-butadiene resins and polybutadiene dissolved in (2) a polymerizable solvent selected from chlorostyrene and mixtures of acrylonitrile with chlorostyrene, styrene or vinyl toluene and containing (3) an organic peroxide catalyst and (4) a catalyst promoter which is a mixture (ranging from 3:5 to 1:13) of cobalt and zinc carboxylic acid salts. The mixed catalyst promoter does not discolor the adhesive composition and provides a more rapid rate of curing than either the cobalt or the zinc salt used alone.

---

This invention relates to a polymerizable adhesive composition, and in particular, the invention relates to a reactive solvent based adhesive composition which is useful for bonding to polystyrene, acrylonitrile-styrene, and acrylonitrile-butadiene-styrene resin substrates. In addition, this invention relates to an improved catalyst promoter system which is used to polymerize the novel reactive solvent based adhesive composition.

Recent developments in the adhesive bonding of thermoplastic resins have indicated that reactive solvent based systems are the most promising adhesives. High shrinkage of the substrate to which the adhesive is applied due to evaporation of solvent is avoided by using a reactive solvent. Unfortunately, the reactive solvent based adhesives which are currently being used have several disadvantages. The formation of stress cracks (stress crazing) in the regions of the resin substrate near the glue-line is still a problem and results in adherend failure under stress, i.e. the weakened regions of the substrate are pulled out of the bulk of the resin substrate. This is apparently caused by either poor solubility of the resin substrate in the polymerizable solvent or the rapid diffusion of the solvent into the resin substrate. In addition, the currently used polymerizable adhesive compositions require several days for complete curing, and this often renders their use impractical. Another problem is that the catalyst promoter which is most generally used to polymerize the adhesive causes an undesirable dark green color to develop in the adhesive composition.

It is an object of this invention to provide a polymerizable adhesive composition which does not induce stress crazing in the plastic substrate to which it is applied.

Another object of the invention is to provide a polymerizable adhesive composition which can be rapidly cured and has improved bond strength.

A further object of this invention is to provide a mixed catalyst-promoter system for a polymerizable adhesive composition which does not discolor the adhesive and which provides a rapid rate of cure.

Other objects and advantages of this invention will be apparent to those skilled in the art in view of the following complete description of the invention.

It has been discovered that an improved polymerizable adhesive composition can be prepared by combining a polymerizable solvent, a synthetic resin solute, a peroxide catalyst and a mixed catalyst promoter. It is particularly preferred that the polymerizable solvent-synthetic resin solute combination, when cured, have a composition substantially similar to the substrate resin.

In accordance with the invention, the polymerizable solvent is selected from styrene-acrylonitrile, vinyl toluene/acrylonitrile, chlorostyrene and chlorostyrene-acrylonitrile. Styrene and vinyl toluene alone have both been tried as solvents but were generally unsatisfactory because they required a long time to completely cure (2 days or longer), induced stress crazing in the substrate, and yielded poor bond strengths. It has been found that combining acrylonitrile with the styrene or vinyl toluene, in amounts sufficient to provide at least about 1 part by weight of acrylonitrile per 5 parts of styrene or vinyl toluene, reduces the cure time to about one day or less, provides greatly improved bond strength, and substantially overcomes substrate stress crazing. Chlorostyrene has a reactivity much greater than styrene and has been found to be satisfactory either when used alone or in combination with acrylonitrile.

In general, the reactive solvent adhesive compositions of this invention are useful adhesives for polystyrene resins and modified polystyrene resins such as acrylonitrile modified styrenes and acrylonitrile-butadiene-styrene resins. To improve the chemical and physical similarity of the adhesive composition and substrate resin, a synthetic resin solute is incorporated in the reactive solvent. It has been determined that improved bond strength and flexibility are achieved if the cured adhesive has a composition substantially similar to the substrate resin, and therefore, the resin solute should be selected to achieve this condition. Since these adhesives are particularly formulated for use with polystyrene and modified polystyrene resins, the resin solute is selected from polystyrene, acrylonitrile-butadiene rubbers, acrylonitrile-butadiene-styrene resins, styrene-acrylonitrile resins, styrene-butadiene resins, and polybutadiene. Of course, the resin solute must be soluble in the reactive solvent.

The presence of the resin solute in the adhesive composition is also essential to provide the adhesive with the proper viscosity. In fact, viscosity is the most important factor in determining the preferred resin solute content. If the viscosity is too high, it produces uneven seals with peaking and the flow into voids is too slow. On the other hand, if the viscosity is too low, the adhesive will "run" and will produce "starved" joints, i.e. insufficient adhesive in the bonding region. In general, resin solute contents ranging from about 25% to 35% by weight based on the total solvent plus solute content are satisfactory.

It is preferred to use an organic peroxide catalyst to cure the adhesive composition such as benzoyl peroxide, lauroyl peroxide and cyclohexanone peroxide. It is particularly preferred to use methylethyl ketone peroxide which is commercially available as a 60% dispersion in dimethyl phthalate. The amount of peroxide catalyst used to cure the adhesive is not critical and is a matter of operator's choice. In general, catalyst concentrations ranging from about 1 to about 5 parts by weight per hundred parts of resin solute-reactive solvent composition have been found to be satisfactory, and 2 parts per hundred has yielded particularly good results.

It has also been discovered that discoloration of the adhesive composition and a more rapid cure rate can be achieved by using a mixed cobalt/zinc catalyst promoter. It is known that cobalt in the form of cobalt naphthenate is a good catalyst promoter for organic peroxide catalysts, but when used alone, it causes a green discoloration of the adhesive composition due to the oxidation of $Co^{+2}$ to $Co^{+3}$, and the rate of cure is slow. Other promoters were tried, including stannous octoate, zinc naphthenate and lead naphthenate, but they required an even longer cure time than the cobalt naphthenate. Unexpectedly, it was discovered that a combination of cobalt and zinc has a synergistic effect which provides a greatly improved curing rate. In addition, the undersirable green discoloration can be avoided by using the combination catalyst promoter, particularly when there is substantially more zinc than cobalt present. A cobalt/zinc ratio of about 1/9 yields particularly good curing rates and substantially avoids the green discoloration though Co/Zn ratios of about 1/4 to about 1/13 are generally satisfactory. The total amount of catalyst promoter incorporated into the adhesive composition is not critical and is generally a matter of operator's choice. Catalyst promoter concentrations ranging from about .05 to about 0.5 part by weight per hundred parts of adhesive composition (polymerizable solvent plus resin solute) have been found to be satisfactory. The cobalt and zinc catalyst promoters should be used in the form of dispersions of compounds such as naphthenates, linoleates, tall oil acid salts, etc.

The following examples illustrate the advantages achieved by using the adhesive compositions of this invention, and in particular, the synergistic effect resulting from a mixed cobalt/zinc catalyst promoter system:

Example I

A test was performed in which cobalt in the form of cobalt naphthenate (CN) catalyst promoter was compared to cobalt/zinc in the form of cobalt naphthenate/zinc naphthenate (1:9 Co/Zn). The cobalt naphthenate was dispersed in mineral spirits having a total cobalt content of 6% by weight, and the zinc naphthenate was also dispersed in mineral spirits having a total zinc content of 8%. The adhesive composition used to carry out the test was as follows:

|  | Parts |
|---|---|
| 25% solution of ABS resin (Cycolac) in 3:1 styrene/acrylonitrile solvent | 100 |
| Methylethyl ketone peroxide 60% dispersion in dimethyl phthalate | 2 |
| Catalyst promoter dispersion in mineral spirits | 1 |

The adhesive properties were determined by applying the adhesive to butt-joint and T-joint specimens made from acrylonitrile-butadiene-styrene resin (Cycolac) and measuring the bond strength by determining the force necessary to break the joint. The resistance to degradation of the adhesive compositions in alkali and acid was also tested by molding and curing at room temperature for 72 hours discs of the adhesives, and then immersing the discs in 40% potassium hydroxide (KOH) and in 1.300 sp. g. sulfuric acid ($H_2SO_4$) at 150° F. for 14 days. Resistance was determined by measuring weight loss. The following results were obtained:

|  | CN | 1:9 Co/Zn |
|---|---|---|
| T-joint | 64 lb. | 99 lb. |
| Butt-joint | 1,950 p.s.i | 2,570 p.s.i. |
| Cure time (25 gm.) | About 21 hrs | Less than 16 hrs. |
| Color | Green | White. |
| Weight loss: |  |  |
| 40% KOH | −3.02% | −1.04%. |
| 1.300 sp. g. $H_2SO_4$ | −2.90% | −1.14%. |

These tests clearly demonstrate the improved bond strength and rate of cure achieved by the mixed catalyst promoter system. There is also improved resistance to alkali and acid which is important when the adhesive is used to bond or seal battery containers. The high T-joint value indicates a decreased stress crazing effect achieved with the mixed promoter. In addition, the mixed catalyst promoter avoided the green discoloration problem. These improved results using the mixed promoter were very unexpected since a zinc naphthenate dispersion alone yielded poorer bond strengths and required a longer cure time than a cobalt naphthenate dispersion alone.

Example II

A solution of 25% by weight of acrylonitrile-butadiene rubber having a high acrylonitrile content (Chemigum N–206) in 3:1 styrene/acrylonitrile solvent was formed and used to bond acrylonitrile-butadiene-styrene resin samples. This adhesive composition was cured at room temperature for 72 hours using a 60% solution of methylethyl ketone peroxide in dimethyl phthalate as catalyst (2 parts/hundred of adhesive) and 2 different mixed catalyst promoter solutions (1 part/hundred of adhesive). The bonded samples were tested for butt-tensile strengths using a Thwing-Albert Electrohydraulic Tensile Tester model 30 FM–24 to determine the effectiveness of a solution of cobalt naphthenate/zinc naphthenate (CN/ZN) in mineral spirits as compared to a solution of cobalt naphthenate/lead naphthenate (CN/LN) in mineral spirits. The following results were recorded:

| Promoter System | Bond Strength, p.s.i. | Cure Properties |
|---|---|---|
| CN/LN (1:7) | 45 | Very soft; not completely cured. |
| CN/ZN (1:7) | 1,150 | Hard; complete cure in less than 24 hrs. |

These results clearly demonstrate that the CN/ZN is greatly superior to the CN/LN combination. In addition, it demonstrates that improved results are not always achieved merely by combining catalyst promoters and that the synergistic effect of the cobalt/zinc combination is unexpected.

Example III

To investigate the problem of stress crazing, breaking loads for T-joints were determined. The T-joints consisted of a panel of acrylonitrile-butadiene-styrene (ABS) resin 1½ inch by 1 inch by ⅛ inch as base plate and a shorter vertical piece 1 inch by 1 inch by ⅛ inch. The vertical piece had a ¼ inch wide base, giving the piece a T shape, which was bonded to the base plate with the adhesive being tested. An adhesive composition in accordance with this invention was used to bond 6 samples and had the following composition:

|  | Parts |
|---|---|
| 30% ABS chips (Cycolac T–2501) in 3:1 styrene/acrylonitrile solvent | 100 |
| Methylethyl ketone peroxide 60% dispersion in dimethyl phthalate | 2 |
| 1:7 CN/ZN dispersion in mineral spirits | 1 |

This was compared to a currently used adhesive having the following composition:

|  | Parts |
|---|---|
| 20% polystyrene resin dissolved in styrene monomer | 100 |
| Methylethyl ketone peroxide 60% dispersion in dimethyl phthalate | 2 |
| CN dispersion in mineral spirits | 1 |

After 5 days room temperature cure, a load was applied to determine the breaking load for 6 samples with each adhesive. The results are reported averaging the breaking load for each of the six samples:

Current adhesive
62 lbs. (failure in substrate)

Inventive adhesive
99 lbs. (failure in glue line)

The substrate failure with the current adhesive indicates stress crazing which was avoided by the adhesive of this invention.

Another feature of this invention involves the use of a novel resin solute/reactive solvent adhesive composition. It has been found that bond strength varies directly with acrylonitrile content, and therefore, acrylonitrile and styrene or vinyl toluene are combined to form the polymerizable solvent. Acrylonitrile alone cannot be used as the solvent for it is a poor solvent and it reacts too rapidly.

Example IV

15% by weight of acrylonitrile-butadiene rubber (Chemigum N–206 and N–325) was dissolved in various solvents to form an adhesive solution. The monomers used as solvents were styrene, acrylonitrile and vinyl toluene. The adhesive solutions were applied to lap joints ¼ inch by ¼ inch of ABS resin strips and were cured for 96 hours at room temperature. 60% methylethyl ketone peroxide in dimethyl phthalate (2 phr.) and cobalt naphthenate dispersed in mineral spirits (1 phr.) were used to cure the adhesive. Chemigum N–206 was not dispersible in vinyl toluene. The following results were recorded:

Bond strength, p.s.i.
15% N–206 in 3:1 ST/AN _____ 1182
15% N–206 in 3:1 VT/AN _____ 983
15% N–325 in VT _____ 426
15% N–325 in 3:1 VT/AN _____ 1120

These results illustrate the utility of styrene and vinyl toluene in combination with acrylonitrile and also the improved bond strength achieved when acrylonitrile monomer is present in the solvent.

Example V

A series of tests was performed to examine the effect and properties of various styrene/acrylonitrile solvent ratios, cobalt/zinc catalyst promoter ratios and different solute contents. ABS resin chips (Cycolac T–2501) was the solute resin, 2 phr. of 60% methylethyl ketone peroxide in dimethyl phthalate was the catalyst, and 1 phr. of mixed catalyst promoter dispersed in mineral spirits was used. Samples prepared for butt-joints were wiped with alcohol, the adhesives were applied immediately after mixing, and the joints were allowed to cure for 48–72 hours before testing for bond strength.

For comparison, a standard composition comprising 25% polystyrene in styrene solvent was cured with methylethyl ketone peroxide solution (2 phr.) and cobalt naphthenate dispersed in mineral spirits (1 phr.). This adhesive composition was very slow curing, requiring about 5 days for complete cure, and yielded a tensile strength of 2366 p.s.i. In addition, this adhesive cured to a solid green mass.

An attempt was made to cure 25% ABS resin in acrylonitrile alone, but the promoter system was insoluble in the acrylonitrile and the catalyzed mixtures had not cured after 2 weeks.

The results of these tests are tabulated below.

| ST/AN | Co/Zn | Percent Resin Solids | Tensile Strength (p.s.i.) | Cure Time (hrs.) | Remarks |
|---|---|---|---|---|---|
| 8:1 | 1:13 | 25 | 2,551 | ~43 | Slow curing. |
| 5:1 | 1:4 | 25 | 2,800 | ~28 | Moderate cure rate. |
| 8:1 | 1:4 | 25 | 2,580 | ~43 | Slow curing. |
| 8:1 | 1:9 | 25 | 2,705 | ~43 | Do. |
| 5:1 | 1:9 | 25 | 2,403 | ~28 | Moderate cure rate. |
| 5:1 | 1:13 | 25 | 2,374 | ~26 | Do. |
| 3:1 | 3:4 | 25 | 2,445 | <16 | Rapid cure. |
| 3:1 | 1:4 | 25 | 2,704 | <16 | Do. |
| 3:1 | 1:9 | 25 | 2,541 | <16 | Do. |
| 3:1 | 1:9 | 25 | 2,703 | <16 | Higher visc. rapid cure. |
| 3:1 | 1:9 | 30 | 2,612 | <16 | Do. |
| 3:1 | 1:13 | 35 | 2,971 | <16 | Lower visc. rapid cure. |
| 1:1 | 3:4 | 25 | 3,151 | <16 | Violently rapid, foams, sediment. |
| 1:1 | 1:4 | 25 | 2,398 | <16 | Do. |
| 1:1 | 1:9 | 25 | 2,244 | <16 | No foaming, some sediment. |
| 1:1 | 1:13 | 25 | 2,162 | <16 | Do. |
| 1:3 | 3:4 | 25 | 2,235 | <16 | Violently rapid, foams, sediment. |
| 1:3 | 1:4 | 25 | 2,739 | <16 | Do. |
| 1:3 | 1:9 | 25 | 2,362 | <16 | No foaming, sediment. |
| 1:3 | 1:13 | 25 | 2,588 | <16 | Foams, sediment. |

These results indicate that the preferred adhesive compositions utilizing these particular ingredients comprise 25–35% ABS resin chips dissolved in 5:1–3:1 styrene/acrylonitrile and containing a Co/Zn catalyst promoter having a 3:4–1:13 ratio.

Example VI

Chlorostyrene is much more reactive than styrene, and so it was tested as a reactive solvent, alone and in combination with acrylonitrile. Adhesive compositions comprising 25% solutions of natural and carbon black filled polystyrene resin (Dow 475 and Bakelite 2100) in chlorostyrene (CS) and in 3:1 CS/AN were prepared and catalyzed with 2 phr. of methylethyl ketone peroxide in dimethyl phthalate and 1 phr. of Co/Zn naphthenate dispersed in mineral spirits. The results were as follows:

| Resin | Solvent | Solubility | Cure Time, (hrs.) | Remarks |
|---|---|---|---|---|
| Dow 475 (black) | CS | Soluble | 6 | Tack free, hard. |
| Natural 2100 | CS | do | 16 | Hard, sl. less tack. |
| Black 2100 | CS | Swollen | 5½ | Hard, tack free. |
| Dow 475 (natural) | 3:1 CS/AN | Soluble | 16 | Do.. |
| Dow 475 (black) | 3:1 CS/AN | do | 16 | Hard, sl tack. |
| 2100 (natural) | 3:1 CS/AN | do | 16 | Hard, tacky. |
| 2100 (black) | 3:1 CS/AN | Swollen | 16 | Hard, sl. tack. |

The chlorostyrene reduced the cure time to 16 hours or less. Chlorostyrene proved to be a better solvent than styrene for Dow 475 is only partially soluble in styrene.

Example VII

Viscosity is the most important consideration in determining the optimum solute content. Viscosities of ABS chips (Cycolac) in 3:1 ST/AN solvent were used to illustrate the effect of viscosity on bond strength. Viscosities were measured with a Brookfield LTV viscometer using a No. 3 spindle at the indicated speed, and the adhesive compositions were thereafter cured in accordance with this invention. The results were as follows:

| Solids Content | Bond Strength, p.s.i. | Viscosity, cps. |
|---|---|---|
| 20% ABS Chips | 2,129 | [1] 160 |
| 25% ABS Chips | 2,541 | [1] 580 |
| 30% ABS Chips | 2,703 | [1] 1,780 |
| 35% ABS Chips | 2,612 | [2] 9,800 |

[1] 60 r.p.m.  [2] 12 r.p.m.

The decreased bond strength at the high viscosity indicates the extent to which the flow of the adhesive into the substrate pores was retarded.

Having completely described the invention, what is claimed is:

1. A polymerizable adhesive composition consisting essentially of a polymerizable solvent selected from the group consisting of styrene/acrylonitrile, vinyl toluene/acrylonitrile, chlorostyrene and chlorostyrene/acrylonitrile, a solute soluble in said polymerizable solvent and selected from the group consisting of polystyrene, acrylonitrile-butadiene rubbers, acrylonitrile-butadiene-styrene resins, styrene-acrylonitrile resins, styrene-butadiene resins and polybutadiene, an organic peroxide catalyst, a catalyst promoter consisting essentially of a mixture of cobalt and zinc carboxylic acid salts in which the ratio of cobalt to zinc ranges from about 3:4 to about 1:13, and said solute being present in amounts ranging from about 15% to about 35% by weight of the total solute plus solvent content.

2. A composition in accordance with claim 1 in which the organic peroxide catalyst ranges from about 1 to about 5 parts by weight per hundred parts of the solute-solvent composition and the catalyst promoter ranges from about 0.05 to about 0.5 part by weight per hundred parts of the solute-solvent composition.

3. A composition in accordance with claim 2 in which the solute is present in amount ranging from about 25% to about 35% by weight of the total solute plus solvent content.

4. A composition in accordance with claim 3 in which the solvent contains acrylonitrile and the weight ratio of styrene, vinyl toluene or chlorostyrene to acrylonitrile ranges from about 5:1 to about 3:1.

5. A composition in accordance with claim 4 in which the solute is an acrylonitrile-butadiene-styrene resin and the solvent is styrene-acrylonitrile.

6. A composition in accordance with claim 2 in which the solvent is chlorostyrene.

References Cited

UNITED STATES PATENTS

| 1,895,200 | 1/1933 | Meidert | 106—310 |
| 1,974,507 | 9/1934 | Pohl et al. | 106—310 XR |
| 2,631,944 | 3/1953 | Coffey et al. | 106—310 XR |
| 2,407,143 | 9/1946 | Daur et al. | 260—880 XR |
| 2,931,784 | 4/1960 | Raymond | 260—863 |

GEORGE F. LESMES, *Primary Examiner.*

K. E. KUFFNER, *Assistant Examiner.*

U.S. Cl. X.R.

156—331, 333, 334; 260—881, 884, 886